(12) United States Patent      (10) Patent No.: US 7,331,803 B2
Steigerwald et al.      (45) Date of Patent: Feb. 19, 2008

(54) POWER CONTROL SYSTEM AND METHOD

(75) Inventors: Robert Louis Steigerwald, Burnt Hills, NY (US); Todd Alan Anderson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/582,236

(22) Filed: Oct. 17, 2006

(65) Prior Publication Data

US 2007/0141874 A1    Jun. 21, 2007

Related U.S. Application Data

(60) Provisional application No. 11/061,706, filed on Feb. 17, 2005, now Pat. No. 7,132,757.

(51) Int. Cl.
*H01R 25/00*      (2006.01)

(52) U.S. Cl. ..................................... 439/110

(58) Field of Classification Search ............... 439/110, 439/949, 112, 214; 310/319, 339; 361/683
See application file for complete search history.

(56) References Cited

U.S. PATENT DOCUMENTS

| | | | |
|---|---|---|---|
| 3,624,451 A | 11/1971 | Gauld | |
| 4,542,325 A | 9/1985 | Kobayashi et al. | |
| 4,820,236 A | 4/1989 | Berliner et al. | |
| 5,378,974 A | 1/1995 | Griffin | |
| 5,801,475 A | 9/1998 | Kimura | |
| 6,249,263 B1 * | 6/2001 | Kayser et al. | 345/1.1 |
| 6,320,351 B1 | 11/2001 | Ng et al. | |
| 6,629,850 B2 * | 10/2003 | Kato et al. | 439/76.2 |
| 6,737,789 B2 | 5/2004 | Radziemski et al. | |
| 6,854,988 B2 * | 2/2005 | Marmaropoulos et al. | 439/110 |
| 6,858,970 B2 | 2/2005 | Malkin et al. | |
| 7,105,982 B1 * | 9/2006 | Hagood et al. | 310/319 |

\* cited by examiner

*Primary Examiner*—J. F. Duverne
(74) *Attorney, Agent, or Firm*—Fletcher Yoder

(57) ABSTRACT

A power system includes an energy harvesting device, a battery coupled to the energy harvesting device, and a circuit coupled to the energy harvesting device and the battery. The circuit is adapted to deliver power to a load by providing power generated by the energy harvesting device to the load without delivering excess power to the battery and to supplement the power generated by the energy harvesting device with power from the battery if the power generated by the energy harvesting device is insufficient to fully power the load. A method of operating the power system is also provided.

15 Claims, 4 Drawing Sheets

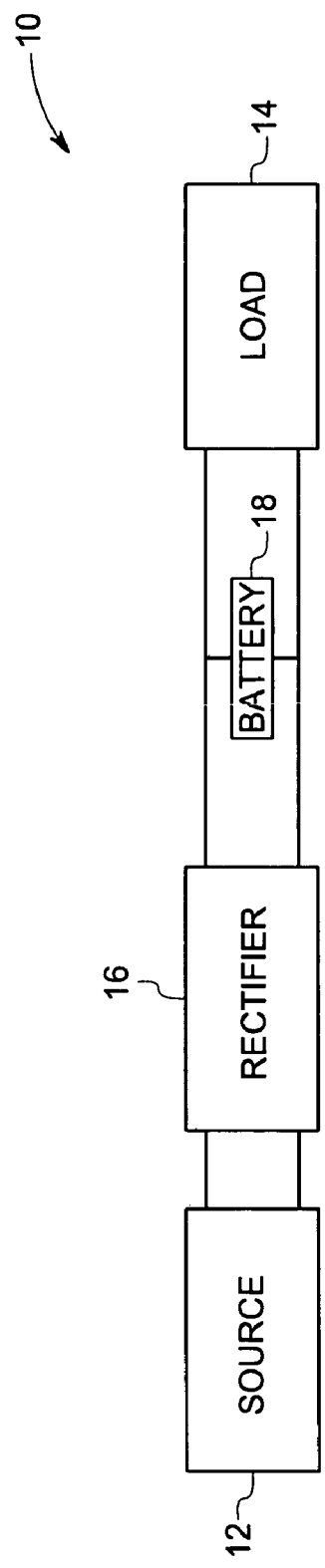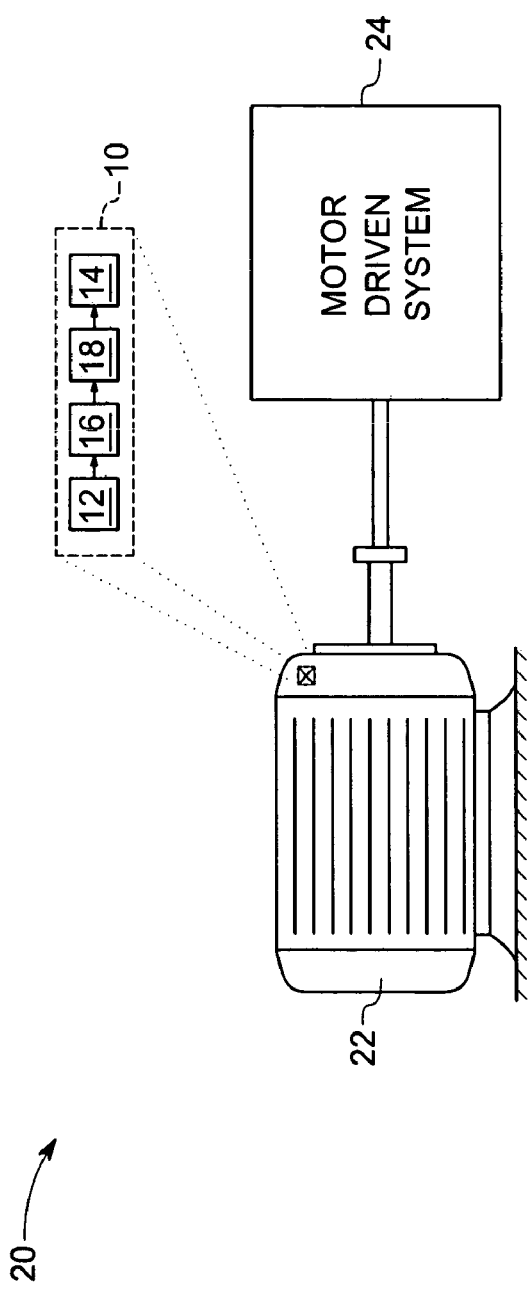

POWER CONTROL SYSTEM AND METHOD

CROSS-REFERENCE TO RELATED APPLICATION

This application is a divisional of Ser. No. 11/061,706, filed on Feb. 17, 2005 now U.S. Pat. No. 7,132,757.

STATEMENT REGARDING FEDERALLY SPONSORED RESEARCH & DEVELOPMENT

This invention was made with Government support under contract number DE-FC36-04GO14001 awarded by Department Of Energy. The Government has certain rights in the invention.

BACKGROUND

The invention relates generally to the field of energy harvesting, and more particularly, to energy harvesting circuits for reducing battery drain.

Energy harvesting is a process for recovering power that is otherwise dissipated or lost in a system. For example, energy harvesting may be used to obtain energy from solar activity, wind, thermal sources, wave action, water currents, and the like. Similarly, energy may be harvested from other sources, such as motor vibrations, pressure changes in the soles of shoes, and the like. In many systems, harvested energy may be used in conjunction with battery power to provide power to a load, such as a sensor or the like. Harvested energy may be used to power the load under normal conditions, with power from the battery being used as a supplement during periods when harvested energy is insufficient to fully power the load. Such systems may extend the useful lifetime of the battery.

Some systems utilize excess harvested energy to recharge the battery in an attempt to further maximize battery life. However, this requires a rechargeable battery for functioning. One drawback with rechargeable batteries is that they have low useful battery life compared to non-rechargeable batteries if there is insufficient harvested energy to recharge the battery.

Other systems utilize a harvesting energy source along with non-rechargeable batteries. In such systems, non-rechargeable batteries are primarily used to prolong the continuous delivery of power to the system. These systems may accidentally charge the battery or deliver an accidental charging current to the battery. Because, the life of non-rechargeable batteries may be affected if they are charged or if they receive a charging current, such systems are not effective for long-life applications. An improved circuit for utilizing harvested energy to power a load in conjunction with a battery is desirable.

SUMMARY

In accordance with one aspect of the present technique, a power system is provided. The power system includes an energy harvesting device, a battery coupled to the energy harvesting device, and a circuit coupled to the energy harvesting device and the battery. The circuit controls delivery of power to a load by (i) providing power generated by the energy harvesting device to the load without delivering excess power to the battery, and (ii) supplementing the power generated by the energy harvesting device with power from the battery if the power generated by the energy harvesting device is insufficient to fully power the load. A method of operating the power system is also provided.

These and other advantages and features will be more readily understood from the following detailed description of preferred embodiments of the invention that is provided in connection with the accompanying drawings.

BRIEF DESCRIPTION OF THE DRAWINGS

FIG. 1 is a block diagram of an exemplary power system in accordance with aspects of the present technique.

FIG. 2 is a block diagram of a motor driven system in accordance with aspects of the present technique.

DETAILED DESCRIPTION OF EXEMPLARY EMBODIMENTS

Figure 3:
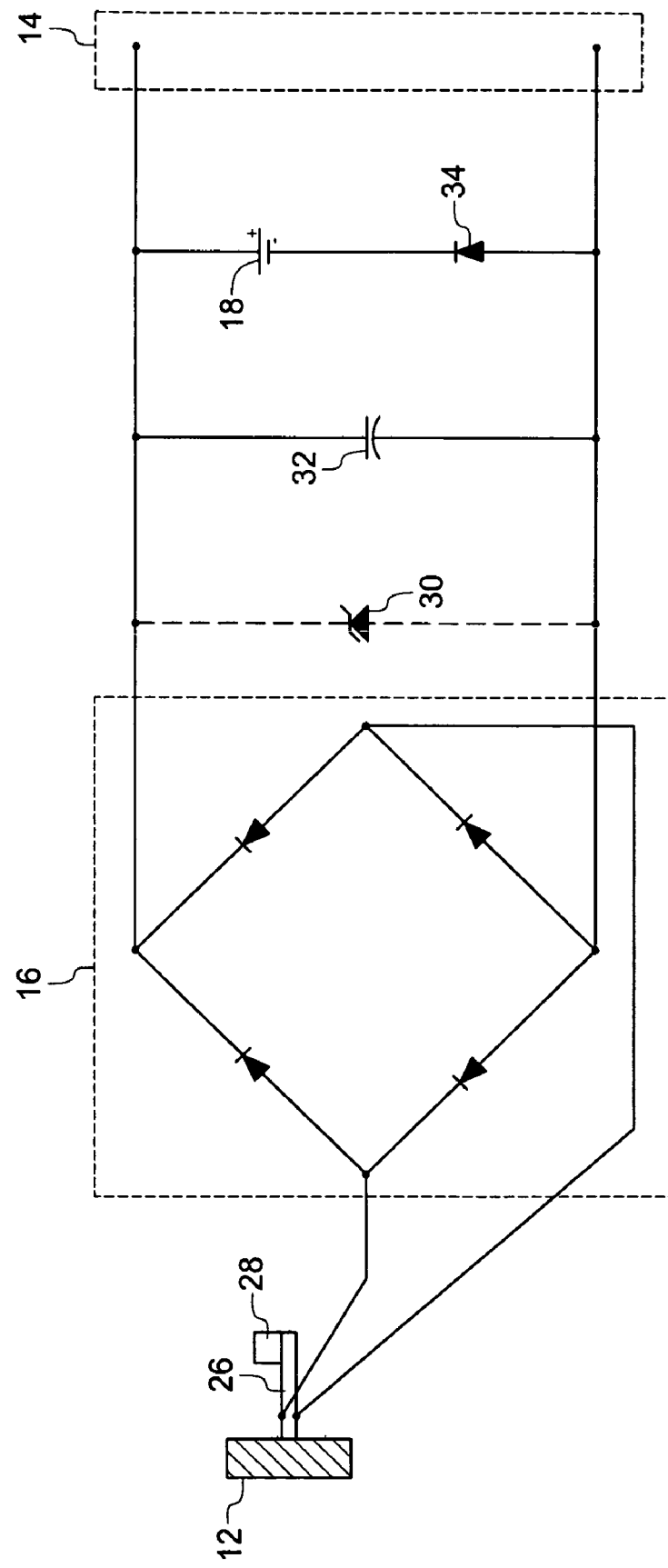
FIG. 3 is a schematic diagram of a power system in accordance with aspects of the present technique.

In subsequent paragraphs, various circuits, systems, and methods for implementation of different aspects of the power system will be described in greater detail. FIG. 1 is a block diagram of an exemplary power system 10 in accordance with aspects of the present technique. The power system 10 comprises an energy harvesting device 12 that provides power to a load 14. The energy harvesting device 12 may be a piezoelectric transducer or a generation device that converts various types of mechanical vibrations or disturbances into electrical power. For example, vibrations from pumps, turbines, engines, bridges when vehicles travel across, and the like may be utilized depending on specific applications. In alternative implementations, an acoustic transducer or a transducer that converts light energy into electrical energy may be employed to generate electrical power. In another implementation, a thermal transducer designed to detect various degrees of thermal gradients may be utilized. The detected thermal gradient may be converted into electrical energy and may be utilized to power the load 14. Similarly, other transducers that can provide electrical energy from any other form of energy may also be utilized.

A rectifier 16 converts varying or alternating current (ac) provided by the energy harvesting device 12 into a direct current (dc) signal. The specific configuration details of the rectifier 14 are matters of design choice and should not be considered limitations to the scope of the present technique. By way of example and not limitation, half-wave, full-wave, or voltage doubling rectifiers may be used as well as voltage multiplying circuits in general. Examples of voltage multiplying circuits include Cockroff and Walton voltage multiplying circuits. The rectified power output of the rectifier 16 is provided to the load 14. A battery 18 supplements the power provided by the energy harvesting device 12, such that if the amount of power required by the load 14 is not provided by the energy harvesting device 12, the battery 18 provides the load 14 with the deficient power. One example of a battery that may be utilized is a Lithium-ion non-rechargeable battery. Furthermore, the power system 10 may be designed to avoid any accidental charging of the battery 18.

Referring generally to FIG. 2, a diagrammatical view of the power system 10 implemented in a motorized system 20 is shown. As illustrated, a motor 22 drives a motor-driven-system 24, and the power system 10 is coupled to the motor 22 for monitoring. Vibrations, for example, bearing vibrations, generated by the motor 22 are converted into electrical power by the energy harvesting device 12 in the power system 10. As had been previously discussed with respect to FIG. 1, the load 14, which is a wireless sensor in this exemplary embodiment, is powered by the harvested power generated by the energy harvesting device 12. However, when the power generated by the vibrations is not enough to power the wireless sensor 14, the battery 18 provides the deficient power.

The wireless sensor 14 may provide a signal indicative of the status of the motor 22. For example, the amount of vibrations generated by the motor 22 increases with aging of the motor 22. This change in vibrations may be detected and transmitted to a remote location by the wireless sensor 14. Alternatively, the amount of vibrations may be detected and transmitted to the remote location for further processing, such as maintenance of motor statistics, periodic maintenance checks, current motor use statistics, and the like. When the vibrations increase in the motor 22, the harvested power is higher and correspondingly lesser amount of power is drawn from the battery at a stage when the wireless sensor 14 requires the maximum power.

The embodiment described hereinabove is just one of the many implementations in which embodiments of the present technique may be employed. However, the system may be modified to incorporate any number of variations, alterations, substitutions or equivalent arrangements. For example, the power system 10 may be incorporated in the tire of a vehicle, wherein a low power wireless sensor may be designed to transmit a plurality of data, including air pressure within the tire, temperature of the tire, and the like. Similarly, the power system 10 may be incorporated in a pedometer, railroads, ductwork in buildings, household appliances that may serve as vibration sources, for providing data representative of one or more parameters of the respective equipment.

FIG. 3 is a schematic diagram of one implementation of the power system 10 in accordance with aspects of the present technique. A vibration source 12 is coupled with a piezoelectric beam 26 that is mechanically tuned, to the expected vibration frequency, with a tuning mass 28. The choice of material and other specifications for the tuning mass 28 may depend on the application and the expected vibration frequency. Alternatively, the length or mass distribution of the piezoelectric beam 26, or both, may be altered to tune the piezoelectric beam 26. The piezoelectric beam 26 generates a varying or ac voltage when vibrations are present. Rectifier 16 transforms ac voltage into dc voltage. An optional zener diode 30 clamps the output voltage level of the rectifier 16 to a desired level. A filter capacitor 32 may be used to smooth or filter variations in the output voltage of the rectifier 16. The voltage across the filter capacitor 32 is directly fed to the load 14. Battery 18 provides power to the load 14 if the voltage across the filter capacitor 32 falls below the battery voltage minus the forward voltage drop of diode 34. This happens when the harvested energy is not sufficient to power the load 14. Diode 34 comes into conduction when the battery 18 is supplying power to the load 14. When energy harvesting device can supply the entire load power, battery 18 does not supply power to the load 14, during which period, diode 34 prevents accidental charging of battery 18. In one embodiment, a Schottky diode 34 is used, which provides a low voltage drop of about 0.3 volts across itself when in conduction.

When vibrations generated are not high enough to supply all of the load energy, diode 34 comes into conduction, and, the piezoelectric source 12 will naturally "ring up" (build up at resonance) in voltage to the battery voltage minus the voltage drop of diode 34. Thus, a portion of the load energy will be supplied from the vibrations. Note that even with relatively low vibrations the output voltage of piezoelectric source 12 will ring up to the battery voltage (minus the voltage drop of diode 34). This is because the piezoelectric source 12 driven at resonance has a relatively high quality factor (Q). If no energy is drawn from the piezoelectric source 12, the output voltage can ring up to relatively high values. Thus, the voltage will ring up until some energy is drawn at the output voltage determined by the battery (minus the voltage drop of diode 34). When no vibrations are present, the battery supplies all of the load power.

Figure 4:
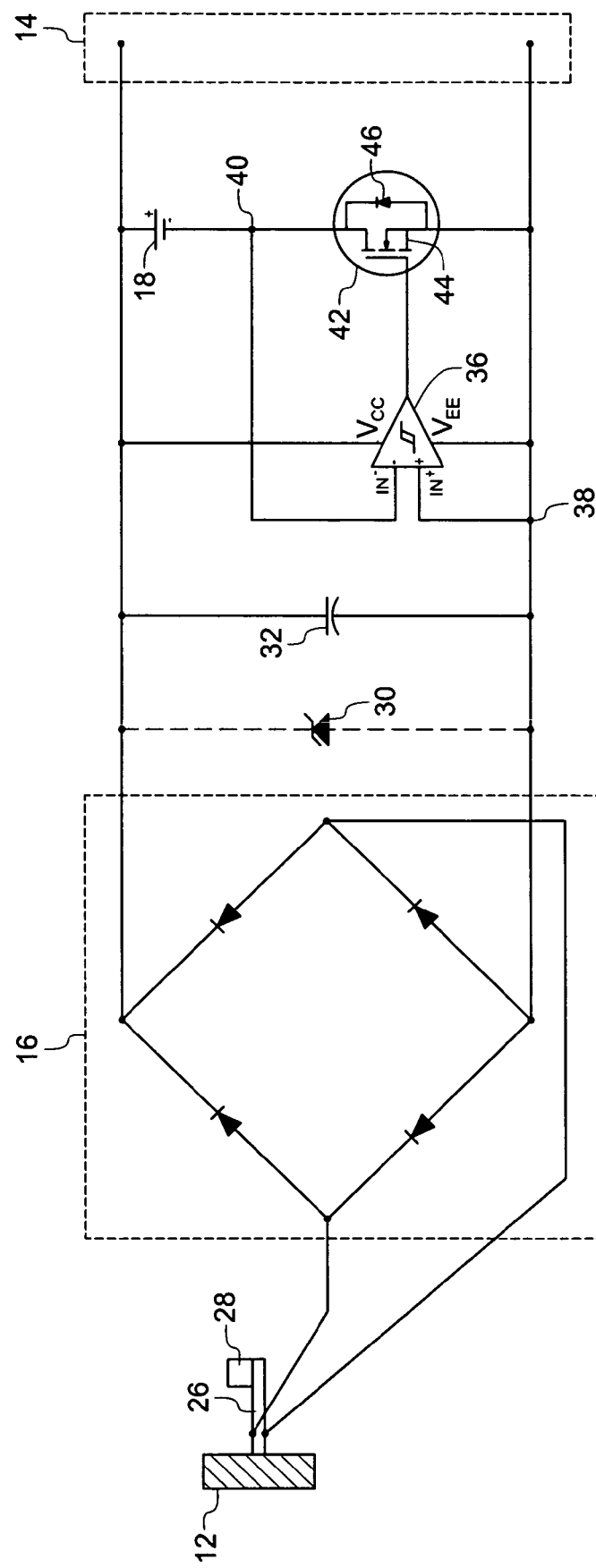
FIG. 4 is a schematic diagram of an alternative embodiment of a power system in accordance with aspects of the present technique.

FIG. 4 is a schematic diagram of an alternative embodiment of a power system 10 in accordance with aspects of the present technique. As described with respect to FIG. 3, the harvested power is rectified, clamped, and filtered by the rectifier 16, zener diode 30, and filter capacitor 32, respectively. The voltage across the filter capacitor 32 is utilized to power a comparator 36. The positive and negative inputs for the comparator 36 are provided from nodes 38 and 40, respectively. Node 38 is at the ground potential, while node 40 is electrically coupled to the negative terminal of battery 18. A MOSFET active diode combination 42 is driven by the output of the comparator 36. In one embodiment, an n-channel enhancement MOSFET 44 is used in the MOSFET active diode combination 42, while the parasitic diode 46 of the MOSFET obviates the need for a separate discrete diode. However, a Schottky diode may be electrically coupled in parallel to the MOSFET active diode combination 42. The drain of MOSFET 44 is connected to node 40 at the negative terminal of the battery 18, while the substrate and the source terminals of MOSFET 44 are tied with the ground at node 38.

A MOSFET of desirable conduction or on resistance may be chosen for producing a voltage drop across itself, which facilitates switching of the comparator 36. However, if a MOSFET 44 is chosen that does not have sufficient resistance, which is required to switch the states of the comparator 36, then an optional resistance element may be introduced between node 40 and the drain of the MOSFET 44. This resistance element will then provide the required voltage drop for switching the comparator 36. When the voltage across the filter capacitor 32 is higher than the voltage across the battery 18 and the MOSFET active diode combination 42 in series, the battery may be subject to charging, so that current will flow in the direction from node 40 to node 38 through the MOSFET active diode combination 42. However, this will cause a drop across the MOSFET 44, which renders node 40 at a positive potential with respect to node 38. However, in the present configuration if node 40 is at a higher potential than node 38, the output of comparator 36 becomes low. This low output of the comparator 36 switches the MOSFET 44 into an off state, preventing charging of the battery 18.

Conversely, when node 40 is at a lower potential compared to node 38, the output of comparator 36 is positive, which causes MOSFET 44 to come into conduction and the battery 18 provides power to the load 14. This happens when the voltage across the filter capacitor 32 is not sufficient to keep the battery from supplying power to the load. Therefore, the MOSFET 44 and diode 46 pair prevents accidental charging of the battery 18 but switches to provide battery power when needed. Furthermore, the MOSFET active diode combination 42 provides a low power consumption of less than about five microwatts when in conduction and supplying tens or hundreds of microwatts.

Figure 5:
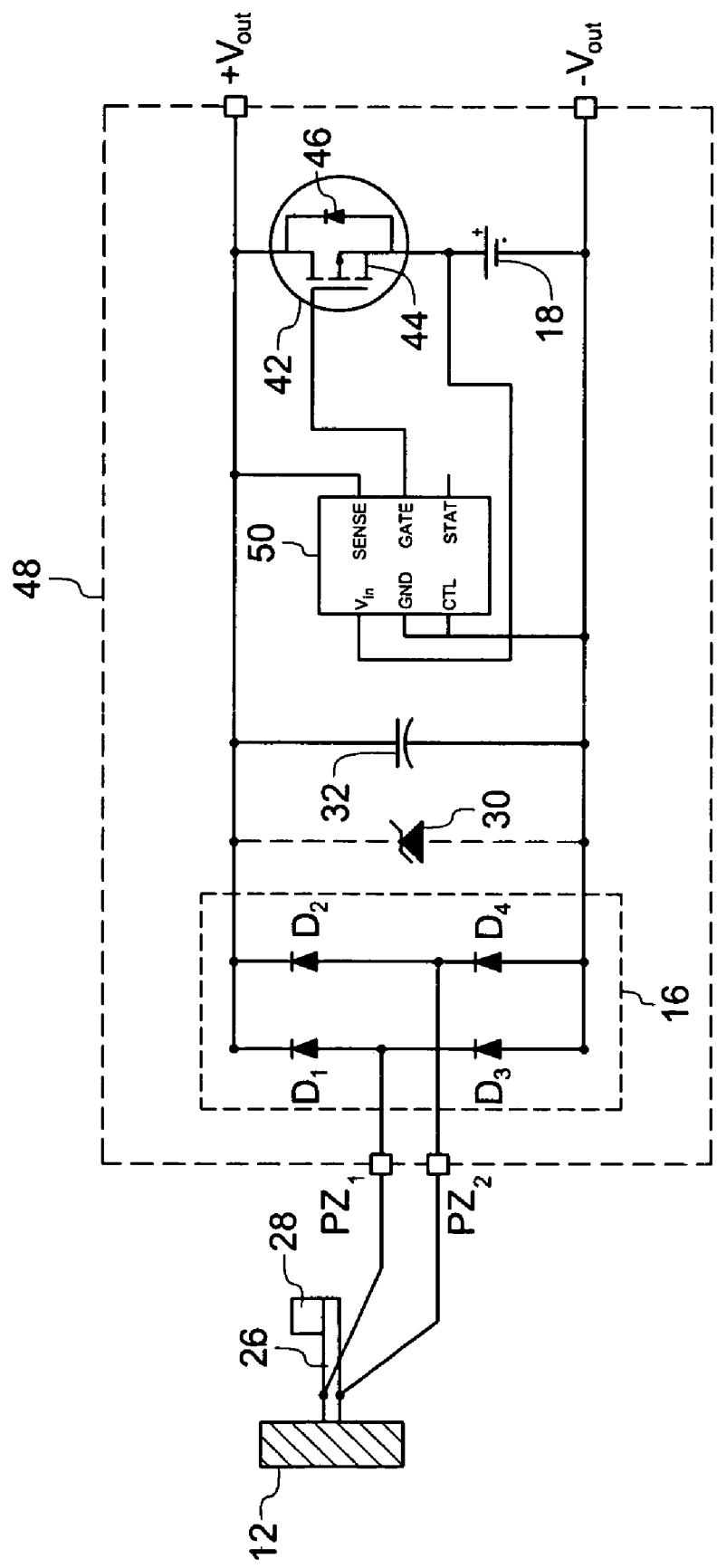
FIG. 5 is a schematic diagram of another alternative embodiment of a power system in accordance with aspects of the present technique.

FIG. 5 is a schematic diagram of another alternative embodiment of the power system 10, which utilizes an integrated circuit 48. As described with respect to FIG. 3 and FIG. 4, the harvested power is rectified, clamped, and filtered by the rectifier 16, zener diode 30, and filter capacitor 32, respectively. An integrated circuit microcontroller 50 may be utilized for switching MOSFET 44, which is a p-channel enhancement MOSFET with its parasitic diode 46, in this exemplary embodiment. One example of an integrated circuit microcontroller that may be utilized is Low Loss PowerPath™ Controller (LTC4412) that is commercially available from Linear Technology Corporate of Irvine, Calif. The power inputs for the microcontroller 50 are provided at the $V_{in}$ and ground (GND) pins. The GATE pin of microcontroller 50 drives the MOSFET 44. When the voltage level at the SENSE pin is higher than the voltage at the $V_{in}$ pin, the microcontroller 50 will pull up the GATE voltage, thus preventing MOSFET 44 from coming into conduction. The load is therefore supplied by the harvested power. In other words, when the harvested power is enough to supply the load fully, battery utilization is minimized. However, once the voltage difference between $V_{in}$ and SENSE pins is higher than about 20 mV, the GATE pin of the microcontroller 50 is pulled down, thus bringing MOSFET 44 into conduction. This causes the battery to supply the deficient power to the load.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A power system, comprising:
   an energy harvesting device;
   a battery coupled to the energy harvesting device; and
   a circuit coupled to the energy harvesting device and the battery, the circuit adapted to control delivery of power to a load by providing power generated by the energy harvesting device to the load without delivering excess power to the battery and to supplement the power generated by the energy harvesting device with power from the battery if the power generated by the energy harvesting device is insufficient to fully power the load.

2. The power system as recited in claim 1, wherein the energy harvesting device comprises a generation device that converts mechanical disturbances into electrical power.

3. The power system as recited in claim 2, wherein the generation device comprises a tuning mass configured to mechanically tune the generation device to a desirable vibration frequency, and configured to maximize the power generated by the energy harvesting device via resonance.

4. The power system as recited in claim 1, wherein the energy harvesting device comprises an acoustic transducer.

5. The power system as recited in claim 1, wherein the energy harvesting device comprises a thermal transducer operable to provide electrical power from thermal gradients.

6. The power system as recited in claim 1, wherein the energy harvesting device comprises a transducer operable to provide electrical energy from light energy.

7. The power system as recited in claim 1, wherein the circuit comprises a diode that prevents charging of the battery by the energy harvesting device.

8. The power system as recited in claim 1, wherein the circuit comprises a comparator coupled to a MOSFET active diode configured to prevent charging of the battery by the energy harvesting device.

9. The power system as recited in claim 8, wherein the MOSFET active diode is configured to reduce power losses in the circuit if the battery is supplying power.

10. The power system as recited in claim 8, wherein the circuit comprises an integrated circuit power controller coupled to the MOSFET active diode to prevent charging of the battery by the energy harvesting device.

11. A power system, comprising:
    a sensor;
    an energy harvesting device operable to deliver power to the sensor;
    a battery coupled to the energy harvesting device and the sensor; and
    a circuit coupled to the energy harvesting device and the battery, the circuit adapted to control delivery of power to the sensor by providing power generated by the energy harvesting device to the sensor without delivering excess power to the battery and to supplement the power generated by the energy harvesting device with power from the battery if the power generated by the energy harvesting device is insufficient to fully power the sensor.

12. The power system as recited in claim 11, wherein the sensor comprises a wireless sensor.

13. The power system as recited in claim 11, wherein the sensor is coupled to a motor and is adapted to provide status data of the motor to a remote monitoring system.

14. The power system as recited in claim 13, wherein the energy harvesting device comprises a piezoelectric source disposed on the motor that converts vibrations of the motor into electrical power.

15. The power system as recited in claim 13, wherein the status data comprises data representative of a lifetime of the motor.

* * * * *